(12) United States Patent
Amon et al.

(10) Patent No.: US 7,793,490 B2
(45) Date of Patent: Sep. 14, 2010

(54) EXHAUST GAS SYSTEM FOR DIESEL VEHICLES WITH AN SCR CATALYTIC CONVERTER

(75) Inventors: Bernd Amon, Bamberg (DE); Herbert Albert, Erlangen (DE); Peter Reif, Erlangen (DE); Yohann Perrot, Belleville-en-Caux (FR); M. Stéphane Londos, Etueffont (FR); Werner Peter, Wettstetten (DE)

(73) Assignees: Faurecia Abgastechnik GmbH, Fuerth (DE); Audi AG, Ingolstadt (DE)

( * ) Notice: Subject to any disclaimer, the term of this patent is extended or adjusted under 35 U.S.C. 154(b) by 140 days.

(21) Appl. No.: 11/861,707

(22) Filed: Sep. 26, 2007

(65) Prior Publication Data

US 2008/0295495 A1 Dec. 4, 2008

(30) Foreign Application Priority Data

Sep. 26, 2006 (DE) .................. 10 2006 045 435

(51) Int. Cl.
*F01N 3/00* (2006.01)
(52) U.S. Cl. .............................. 60/286; 60/295; 60/301; 60/303; 60/324
(58) Field of Classification Search ........... 60/286–288, 60/301, 303, 295, 324
See application file for complete search history.

(56) References Cited

U.S. PATENT DOCUMENTS

| 6,338,244 | B1 * | 1/2002 | Guenther et al. ............. 60/285 |
| 6,449,947 | B1 | 9/2002 | Liu et al. |
| 6,739,125 | B1 * | 5/2004 | Mulligan ...................... 60/286 |
| 7,334,400 | B2 * | 2/2008 | Yan et al. ..................... 60/286 |
| 7,371,353 | B2 * | 5/2008 | Robel et al. .................. 422/180 |
| 7,552,583 | B2 * | 6/2009 | Robel et al. .................. 60/286 |
| 2003/0121251 | A1 * | 7/2003 | Kelley et al. ................. 60/288 |

FOREIGN PATENT DOCUMENTS

| DE | 38 21 832 C1 | 11/1989 |
| DE | 4203807 A1 | 8/1993 |
| DE | 102 48 294 A1 | 5/2003 |
| DE | 103 06 134 A1 | 9/2003 |
| EP | 1 023 935 A1 | 8/2000 |
| FR | 2892449 A1 | 4/2007 |
| GB | 2 386 845 A | 10/2003 |
| WO | 2006/014129 A1 | 2/2006 |

* cited by examiner

*Primary Examiner*—Thomas E Denion
*Assistant Examiner*—Diem Tran
(74) *Attorney, Agent, or Firm*—Laurence A. Greenberg; Werner H. Stemer; Ralph E. Locher

(57) ABSTRACT

An exhaust gas system for diesel vehicles has a first exhaust line and a second exhaust line that can be connected at the exhaust end to an engine. The first and second lines with their ends pointing downstream are connected to an SCR catalytic converter and a device with which a reducing agent can be introduced into the exhaust gas at a location situated upstream from the SCR catalytic converter. An injection unit for the reducing agent is provided only on the first exhaust line, and a mixing device is provided upstream from the SCR catalytic converter so that the exhaust lines open into the mixing device, where the exhaust gas stream of the first exhaust line to which the reducing agent has been added becomes mixed with the exhaust gas stream from the second exhaust line that is free of reducing agent.

5 Claims, 4 Drawing Sheets

EXHAUST GAS SYSTEM FOR DIESEL VEHICLES WITH AN SCR CATALYTIC CONVERTER

CROSS-REFERENCE TO RELATED APPLICATION

This application claims the priority, under 35 U.S.C. §119, of German patent application DE 10 2006 045 435, filed Sep. 26, 2006; the prior application is herewith incorporated by reference in its entirety.

BACKGROUND OF THE INVENTION

Field of the Invention

The invention relates to an exhaust gas system for diesel engine-propelled vehicles using an SCR catalytic converter. The generic exhaust gas system has first and second exhaust lines that can be connected to an engine at the exhaust end, these ends pointing downstream are connected to an SCR catalytic converter, and to a device with which a reducing agent can be introduced into the exhaust gas at a location upstream from the SCR catalytic converter.

SCR catalytic converters (SCR—selective catalytic reduction) are used to reduce the nitrogen oxides present in the exhaust gas to nitrogen. To do so, a reducing agent is added to the exhaust system at an upstream location, e.g., as disclosed in German patent DE 38 21 832 C1. Urea is the main reducing agent used, being added to the exhaust gas stream in the form of an aqueous solution with the help of an injection system.

Exhaust systems are frequently designed as dual-flow systems in the area connected to the engine, i.e., they have two exhaust lines. Such an embodiment is required, for example, in the case of large-volume engines, which generate a large quantity of exhaust gas accordingly. In the case of a single-flow design of the exhaust system, the exhaust gas treatment devices such as the exhaust gas converter and diesel particulate filter must be designed to accommodate a large volume accordingly and therefore cannot be mounted on the floor group of a vehicle for reasons of space. Therefore, the exhaust line leading away from the engine is initially divided into two exhaust lines, with duplicate exhaust gas treatment devices being provided, i.e., one in each exhaust line. Thus, each exhaust line initially comprises an exhaust gas converter with a diesel particulate filter downstream. The two exhaust lines are combined into one common line upstream from the SCR catalytic converter. As a rule, the transmission block is located in the area of the bottom modular group of a motor vehicle upstream from the SCR catalytic converter so that the two exhaust lines can be brought together only just upstream from the SCR catalytic converter. Injection of reducing agent directly at the point where the two exhaust lines come together would result in inadequate mixing of the exhaust with the reducing agent due to the very short distance covered by the exhaust gas before reaching the SCR catalytic converter. Then some of the exhaust gas flowing through the SCR catalytic converter would contain little or no reducing agent and consequently would remain untreated.

BRIEF SUMMARY OF THE INVENTION

Against this background, it is an object of the invention to provide an exhaust system, which overcomes the above-mentioned disadvantages of the heretofore-known devices and methods of this general type and which achieves the addition of a reducing agent with adequate and thorough mixing with the exhaust gas and to do so with minimal additional equipment complexity.

With the foregoing and other objects in view there is provided, in accordance with the invention, an exhaust gas system for diesel vehicles, comprising:

a first exhaust line and a second exhaust line connected to an exhaust side of an engine;

an SCR catalytic converter connected to said first and second exhaust lines distally from the engine and to receive exhaust gas from the engine;

an injection unit for introducing a reducing agent into the exhaust gas upstream from said SCR catalytic converter only into said first exhaust line; and a mixing device connected to said first and second exhaust lines upstream from said SCR catalytic converter, for receiving the exhaust gas from said first and second exhaust lines and for mixing the exhaust gas from said first exhaust line containing the reducing agent with the exhaust gas from said second exhaust line having substantially no reducing agent upstream of said SCR catalytic converter.

In other words, the objects of the invention are achieved by providing an injection unit for the reducing agent on only one exhaust line, which is referred to below as the first exhaust line, and having a mixing unit upstream from the SCR catalytic converter, with both exhaust lines opening into the mixing unit, where mixing of the exhaust gas stream, which has been combined with reducing agent, of the first exhaust line with the exhaust gas stream of the other exhaust line, namely the second exhaust line, that is free of reducing agent, takes place. This design initially ensures that the reducing agent can be added at a sufficient distance upstream from the SCR catalytic converter so that on the path up to the catalytic converter, mixing of the exhaust gas with the reducing agent can take place optionally with the cooperation of mixing equipment provided in the exhaust gas line. The complexity for production and installation of a second injection unit on the exhaust system is now not necessary according to this invention. The exhaust gas stream that is free of reducing agent is mixed thoroughly with the exhaust gas stream containing the reducing agent upstream from the SCR catalytic converter. Such a mixing unit can be implemented in the form of sheet metal parts that have a simple design and can be manufactured inexpensively, so that the required manufacturing and assembly cost and complexity are lower than those for a second injection unit in the second exhaust line.

In accordance with an added feature of the invention, the mixing unit comprises a housing placed on the SCR catalytic converter into which the second exhaust line opens with an oncoming flow opening, a distribution device for the exhaust gas flowing in through the inlet opening being provided in the housing. The distribution device, as its name indicates, accomplishes the distribution of and/or induces turbulence in the exhaust gas stream and therefore facilitates its mixing with the exhaust gas that is free of reducing agent coming from the second exhaust line. The distribution device may comprise baffles or the like, for example, to induce turbulence or to split the exhaust gas stream into a plurality of substreams having different directions of flow. For example, the distribution device may be formed by a hollow body, the wall of which is permeated by a plurality of opening and whose interior is in fluid connection with the first exhaust line. Almost any shape may be selected for the hollow body, e.g., its cross-sectional shape and outside contour, and it may be adapted to the prevailing conditions. The openings provided in the wall of the hollow body may in principle have any shape. They may be round, oval or slotted openings, but the particular shape is selected, for example, with regard to the best possible mixing of the exhaust gas streams. The exhaust gas flowing into the hollow body is broken down by the very large number of openings provided in this wall into a plurality of individual streams, which emerge from the hollow body in different directions, so that in this way thorough mixing of the first exhaust gas stream with the second exhaust gas stream is achieved. The thorough mixing effect may be further enhanced if the hollow body is arranged directly in front of the opening mouth of the second exhaust line. The second exhaust gas stream must thus flow around the hollow body, so there is also turbulence and thorough mixing of the reducing agent and exhaust gas. As already mentioned, the hollow body can be shaped in almost any way and thus the mixing of the exhaust gas with the reducing agent can be optimized. For example, for technical fluid reasons, the hollow body may be flattened in the direction of flow of the second exhaust gas stream, e.g., having approximately a droplet shape in cross section, to reduce its flow resistance. In an especially effective embodiment that is also especially simple to implement, the hollow body is designed as a pipe section with a sealed and unperforated end. The gas entering the pipe section then leaves the pipe section through its perforated wall. The pipe section can also be designed differently by optimizing the mixing of the reducing agent and exhaust gas. For example, it is conceivable for the pipe section to taper somewhat conically toward its pipe end. With such a design, it is possible to achieve the effect that the exhaust gas flows uniformly through the openings along the length of the hollow body.

In accordance with another feature of the invention, a throttle point is provided in the second exhaust line of the exhaust system. With this throttle point, a pressure drop can be established in the second exhaust line, corresponding to the pressure drop in the first exhaust line caused by the distribution device. This yields the same or at least approximately the same mass flow rates in the two lines.

In accordance with again a further feature of the invention, the mixing unit also includes a housing upstream from the SCR catalytic converter. However, both of the exhaust lines open into the housing in such a way that the respective exhaust gas streams enter the housing essentially tangentially, so the exhaust gas streams have a direction of flow that is essentially tangential to the central longitudinal axis of the SCR catalytic converter. Due to the tangential oncoming flow of the round or oval housing, for example, rotation is induced in the exhaust gas streams in the circumferential direction of the housing, so the exhaust gas streams are thereby mixed thoroughly. It is advantageous not only for reasons of the installation space in the bottom group if the exhaust lines open into the housing at approximately diametrically opposed locations on the housing. Then the exhaust gas flows come together at the center of the housing, resulting in turbulence and thorough mixing with the reducing agent. In an especially preferred variant, this thorough mixing effect is further improved by the fact that the housing has a narrowed section between the mouth area of the exhaust lines and the SCR catalytic converter, the cross-sectional area of this narrowed section being smaller than the end face of the SCR catalytic converter exposed to the exhaust gas. If the wall area of the housing upstream from the narrow point is conical, i.e., is designed in the form of a funnel, then thorough mixing of the exhaust gas with the reducing agent is further optimized. The exhaust gas streams are accelerated in the funnel due to its decreasing cross-sectional area as it comes into proximity to the SCR catalytic converter, thereby improving the mixing effect.

Other features which are considered as characteristic for the invention are set forth in the appended claims.

Although the invention is illustrated and described herein as embodied in exhaust gas system for diesel vehicles using SCR catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
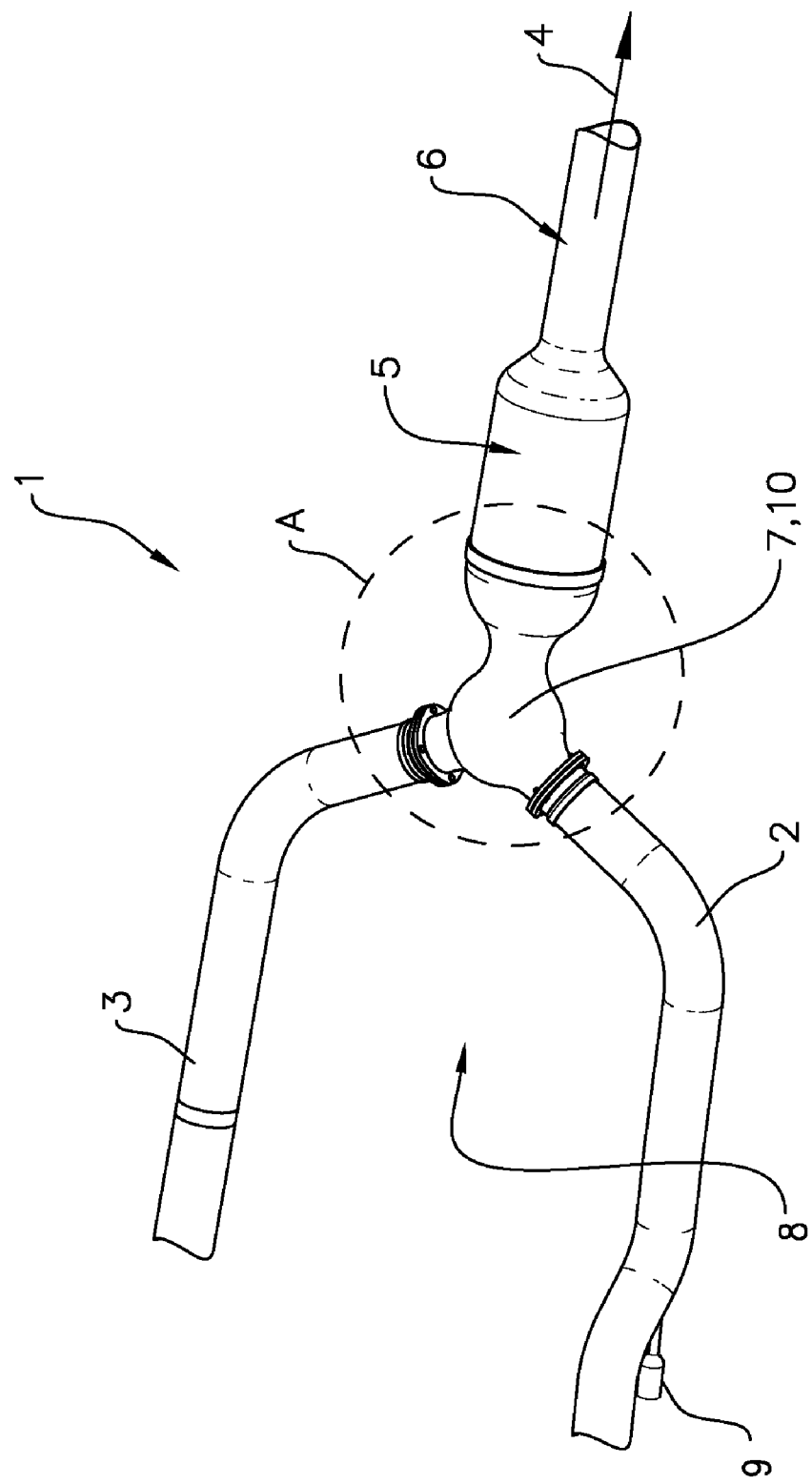
FIG. 1 is a perspective, diagrammatic view of a detail of an exhaust gas system according to the invention.

Referring now to the figures of the drawing in detail and first, particularly, to FIG. 1 thereof, the exhaust system 1 according to the invention is configured with two exhaust lines, also referred to as two parallel lines. The system comprises a first exhaust line 2 and a second exhaust line 3, their ends which face away from the main direction of flow 4 being brought together upstream from an SCR catalytic converter 5 to form a single exhaust line 6. The terms upstream and downstream are used herein with reference to the exhaust gas flow, unless otherwise noted. The connection point 7 of the two pipe ends is situated approximately directly upstream from the SCR catalytic converter 5, e.g., for reasons of space, because the transmission block of the vehicle (not shown) is located in the area labeled with reference numeral 8. An injection unit 9, with which a reducing agent (aqueous urea solution) can be injected into the exhaust gas flowing through the first exhaust line 2, is provided on the first exhaust line 2 in a position upstream from the connection point 7. This distance from the connection point 7 is selected so that the reducing agent injected there will have already become mixed largely homogeneously with the exhaust gas, baffles (not shown) optionally being provided in the first exhaust line 2 to promote a thorough mixing. There is no metered addition of reducing agent on the second exhaust line 3, so that accordingly there is no injection unit there. Thus an exhaust gas stream loaded with reducing agent and an exhaust gas stream without any reducing agent are combined in the area of the connection point 7. In lieu of any other measures to achieve thorough mixing of the exhaust gas flows, only one half, namely the half of the SCR catalytic converter allocated to the first exhaust line 2, would work, i.e., catalyzed nitrogen reduction would essentially occur only there. To avoid this situation, a mixing device 10 is provided in the area of the connection point 7, as shown in detail in two design variants in FIGS. 2 through 4. In these variants, the connection point 7 is a housing 12a, 12b which is mounted on the SCR catalytic converter 5 at the end.

Figure 2:
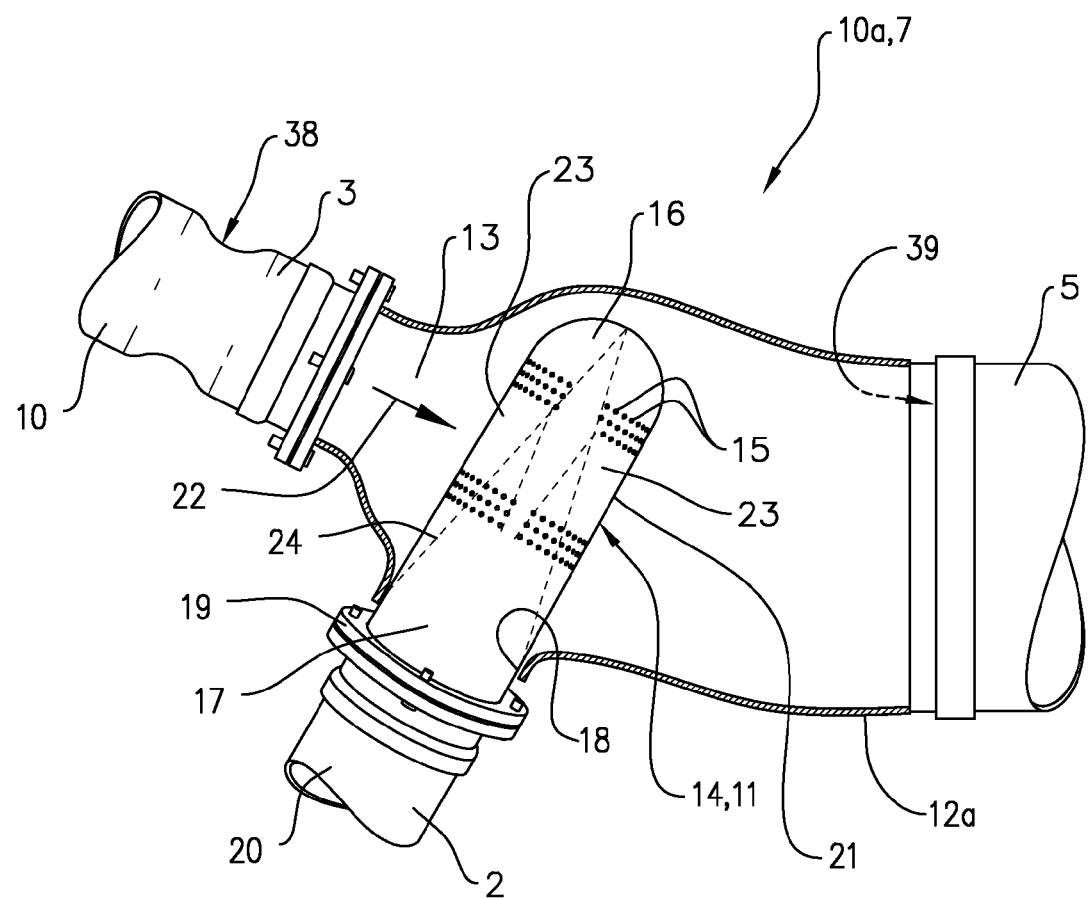
FIG. 2 is a partly sectional, schematic and enlarged view of a detail A from FIG. 1, in a first design variant.

In the design variant shown in FIG. 2, the second exhaust line 3 with an incoming flow opening 13 opens into the housing 12a. Inside the housing 12a there is a distribution unit 11, namely a hollow body, whose interior is in fluid connection with the first exhaust line 2. The wall 21 of the hollow body 14 is perforated, i.e., it has a plurality of openings 15. In the case of FIG. 2, the hollow body 14 was designed with an approximately cylindrical shape, with its end that protrudes into the housing 12a being sealed and not having any perforations. The other end 17 of the hollow body 14 passes to the outside through a housing opening 18 and is connected to the exhaust pipe 20 of the exhaust line 2 via a flange connection 19. The housing opening 18 is positioned and the hollow body is aligned and is of such dimensions that it is arranged upstream from the incoming flow opening 13 and extends beyond and across the direction of the inflowing exhaust gas (arrow 22). Exhaust gas entering through the incoming flow opening 13 approximately in the direction of the arrow 22 thus strikes the hollow body 14 and must flow around it, thereby forming eddies. Openings 15 are arranged at least in the area of the hollow body 14 where the flow passes it. Exhaust gas laden with reducing agent flowing into the hollow body 14 thus flows out through the opening 15 and mixes with the exhaust gas stream of the second exhaust line that is free of reducing agent. As a result, the reducing agent that is supplied through the hollow body 14 is distributed over the entire oncoming flow area of the SCR catalytic converter 5. The oncoming flow area is the free area of the end face 39 of the SCR catalytic converter 5 against which the exhaust gas stream can strike, said free area facing toward the main direction of flow. For optimized mixing of the exhaust gas with reducing agent, it is conceivable to provide openings 15 with a different cross-sectional area and different shape on the hollow body 14. For optimization reasons, it may be expedient not to distribute the openings 15 over the entire circumference or the entire surface area of the hollow body 14 but instead to arrange them in certain areas 23. The shaping of the hollow body 14 itself is also freely selectable with regard to achieving optimum and thorough mixing of the exhaust gas with reducing agent. For example, it is conceivable for the hollow body not to be cylindrical in shape but instead to be conical, which is indicated by the dashed line 24 in FIG. 2. The advantage of such a design is that the back pressure builds up continuously in the conically tapering hollow body 14 up to its end so that the openings 15 receive the exhaust gas uniformly as seen over the length of the hollow body 14.

The distribution unit 11 constitutes a flow resistance for the exhaust gas flowing in the first exhaust line, while the exhaust gas stream of the second parallel does not encounter such resistance. The different flow resistances may lead to nonuniform mass flow rates. To create equal pressure and flow conditions in both exhaust lines, it is expedient if a throttle point 38 is provided in the second exhaust line. This may be formed by a baffle (not shown), which is present in the exhaust pipe 20, or by a constricted area in the exhaust pipe 20.

Figure 3:
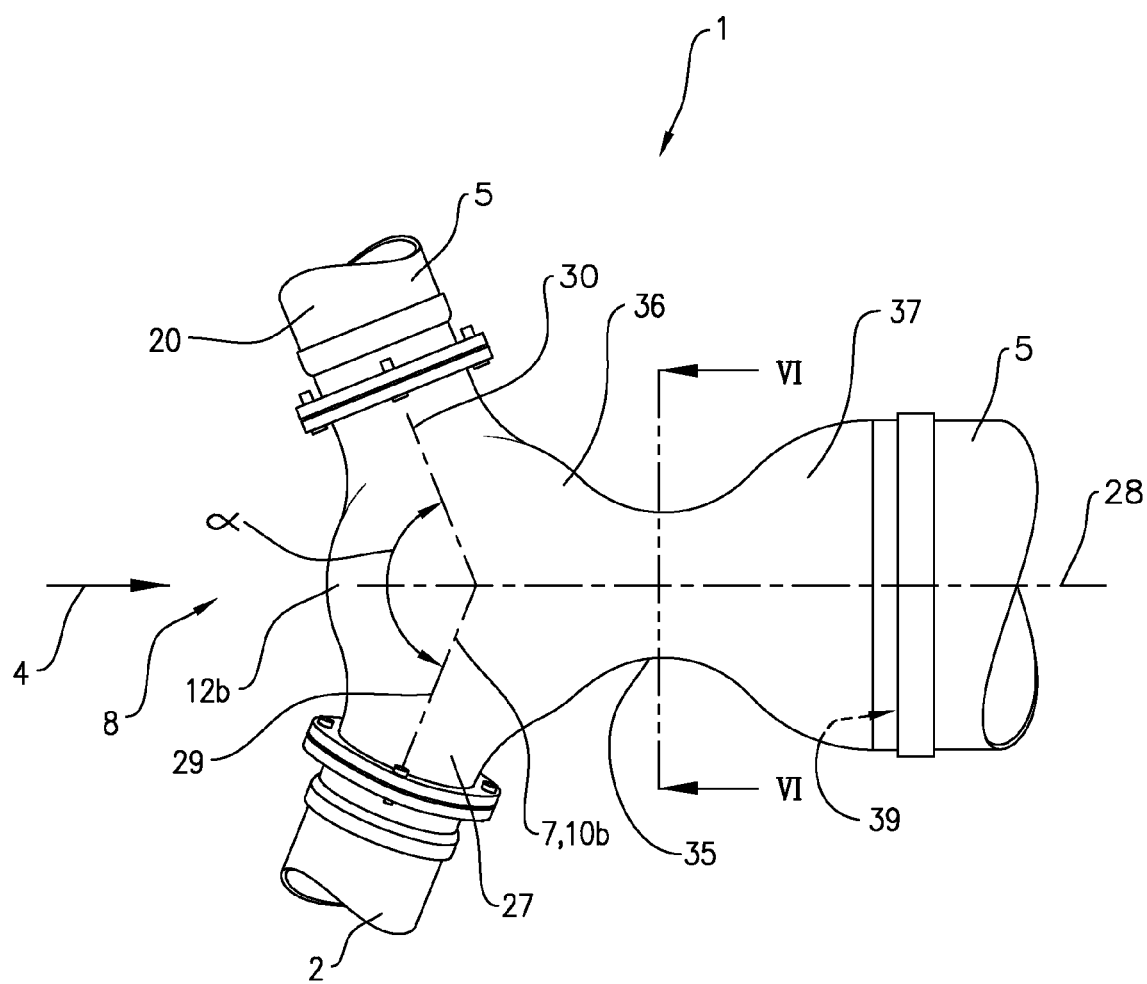
FIG. 3 is a top view of the detail A in a second design variant.
Figure 4:
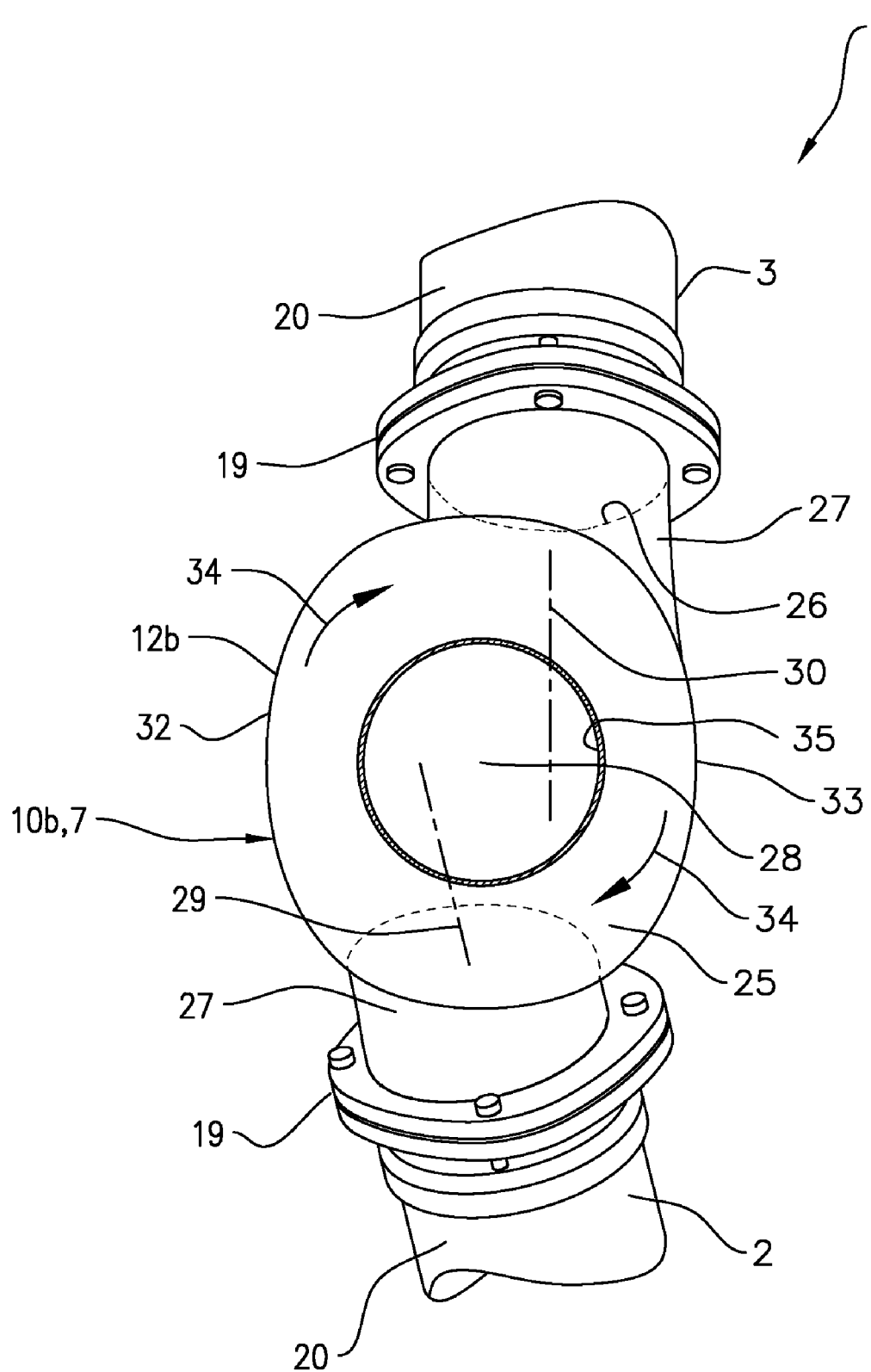
FIG. 4 is a cross section taken along the line IV-IV in FIG. 3.

In the design variant illustrated in FIGS. 3 and 4, the mixing device 10b comprising a housing 12b to the interior of which are connected to the two exhaust lines 2 and 3 each via an oncoming flow opening 25, 26. The exhaust gas pipes 20 of the exhaust lines 2, 3 are each connected by flange connections 19 to connecting pieces 27 of the housing 12b. The connecting pieces 27 and/or the oncoming flow openings 25, 26 are situated approximately in diametrically opposite positions on the housing 12b with respect to the central longitudinal axis 28 of the SCR catalytic converter 5. Furthermore, the connecting pieces 27 are arranged in such a way that their central longitudinal axes 29, 30, i.e., the exhaust gas streams leaving them enter the housing 12b essentially tangentially. The connecting pieces 27 are arranged so that the exhaust gas flows are offset with respect to one another in a direction running across the imaginary connecting line between the connections so that, for example, an exhaust gas stream laden with reducing agent emerging from the first exhaust line 2 will be assigned to the wall area 32 facing the vehicle bottom and an exhaust gas stream emerging from the exhaust line 3 will be assigned to a diametrically opposite wall area 33. The exhaust gas streams thus move toward one another and are set in rotation by a curved, approximately oval or round cross-sectional shape of the housing 12b, e.g., in the direction of the arrows 34 in FIG. 2. In this rotation, the two exhaust lines become mixed and accordingly the reducing agent is distributed within the housing 12b. The central axes 29, 30 of the connecting pieces 27 form an angle α that opens toward the main direction of flow 4, as seen in the view from above in FIG. 3. An exhaust gas stream entering into the housing 12b will thus also have a component in the main direction of flow 4.

The housing area connected to the connection 27 and leading to the SCR catalytic converter 5 as a constriction 35. The wall area 36 of the housing 12b arranged upstream from the constriction 35 in the main direction of flow 4 tapers conically toward the constriction 35, i.e., is designed in the shape of a funnel. The velocity of flow of the exhaust gas which is set in rotation in the area of the oncoming flow openings 25, 26 is greatly increased toward the constriction 35 due to the narrowed section in the cross section of the funnel, which promotes a uniform distribution of the reducing agent in the exhaust gas flow. The wall area 37 extending away from the constriction 35 and toward the SCR catalytic converter 5 is enlarged in form of a funnel in the manner of a diffuser. This embodiment also promotes a uniform and thorough mixing of the exhaust gas with the reducing agent.

The invention claimed is:

1. An exhaust gas system for diesel vehicles, comprising:
   a first exhaust line and a second exhaust line connected to an exhaust side of an engine;
   an SCR catalytic converter connected to said first and second exhaust lines distally from the engine and to receive exhaust gas from the engine;
   an injection unit for introducing a reducing agent into the exhaust gas upstream from said SCR catalytic converter only into said first exhaust line; and
   a mixing device connected to said first and second exhaust lines upstream from said SCR catalytic converter, for receiving the exhaust gas from said first and second exhaust lines and for mixing the exhaust gas from said first exhaust line containing the reducing agent with the exhaust gas from said second exhaust line having substantially no reducing agent upstream of said SCR catalytic converter, said mixing device comprising a housing upstream from said SCR catalytic converter, with said first and second exhaust lines disposed to open into said housing to cause the respective exhaust gas streams to enter the housing substantially tangentially; and
   wherein said housing is formed with a constriction located between a mouth area of said first and second exhaust lines and said SCR catalytic converter, and wherein a cross-sectional area of said constriction is smaller than an end face of said SCR catalytic converter exposed to the exhaust gas.

2. The exhaust gas system according to claim 1, wherein said first and second exhaust lines open into said housing at substantially diametrically opposed locations.

3. The exhaust gas system according to claim 1, wherein said housing has a wall section tapering towards said constriction approximately in a conical shape.

4. An exhaust gas system for diesel vehicles, comprising:
a first exhaust line and a second exhaust line connected to an exhaust side of an engine;
an SCR catalytic converter connected to said first and second exhaust lines distally from the engine and to receive exhaust gas from the engine;
an injection unit for introducing a reducing agent into the exhaust gas upstream from said SCR catalytic converter only into said first exhaust line; and a mixing device connected to said first and second exhaust lines upstream from said SCR catalytic converter, for receiving the exhaust gas from said first and second exhaust lines and for mixing the exhaust gas from said first exhaust line containing the reducing agent with the exhaust gas from said second exhaust line having substantially no reducing agent upstream of said SCR catalytic converter, said mixing device comprising a housing upstream from said SCR catalytic converter, with said first and second exhaust lines disposed to open into said housing to cause the respective exhaust gas streams to enter the housing substantially tangentially; and wherein said second exhaust gas line is formed with a throttle point.

5. An exhaust gas system for diesel vehicles, comprising:
a first exhaust line connected to an exhaust side of an engine;
a second exhaust line connected to the exhaust side of the engine and being formed with a throttle point;
an SCR catalytic converter connected to said first and second exhaust lines distally from the engine and to receive exhaust gas from the engine;
an injection unit for introducing a reducing agent into the exhaust gas upstream from said SCR catalytic converter only into said first exhaust line; and
a mixing device connected to said first and second exhaust lines upstream from said SCR catalytic converter, for receiving the exhaust gas from said first and second exhaust lines and for mixing the exhaust gas from said first exhaust line containing the reducing agent with the exhaust gas from said second exhaust line having substantially no reducing agent upstream of said SCR catalytic converter.

* * * * *